United States Patent [19]

Adams

[11] 4,365,471
[45] Dec. 28, 1982

[54] COMPRESSION WAVE FORMER

[76] Inventor: Joseph S. Adams, 7509 Vivian Dr., Vancouver, British Columbia, Canada

[21] Appl. No.: 91,150

[22] Filed: Nov. 5, 1979

[51] Int. Cl.³ .............................................. F02C 5/02
[52] U.S. Cl. .................................... 60/39.76; 60/633; 89/1 B; 102/305
[58] Field of Search ............. 60/39.76, 39.78, 39.82 P, 60/632, 633, 637, 39.11, 39.77, 247, 249; 89/1 A, 1 B; 102/305, 306, 307

[56] References Cited

U.S. PATENT DOCUMENTS

| | | | |
|---|---|---|---|
| 2,847,826 | 8/1958 | Howes | 60/39.82 P |
| 3,056,257 | 10/1962 | Brunkhardt | 60/39.82 P |
| 3,073,121 | 1/1963 | Baker et al. | 60/39.82 P |
| 3,253,399 | 5/1966 | Bakhtar et al. | 60/633 |

Primary Examiner—Louis J. Casaregola
Attorney, Agent, or Firm—Stonebraker, Shepard & Stephens

[57] ABSTRACT

Compression waves are formed by detonating a mixture of fuel and air confined within a chamber that has a constricted output opening. The mixture is ignited instantaneously throughout a peripheral region of the chamber opposite the output opening, and this region is shaped relative to the dimensions of the chamber and the output opening so that the burning of the mixture accelerates toward the output opening and inward from the peripheral region. This dynamically compresses and detonates the mixture to form a high pressure compression wave and direct it out of the output opening. The instantaneous ignition can be by plasma jets or flames injected into the ignition region from an ignition chamber adjacent to the detonation chamber. The device can directly transform the chemical energy of a fuel into a high pressure thrust directed against a relatively movable resistance to serve as a prime mover suitable for many tasks. It can drive a piston, plunger, or rotor vane; provide propulsive thrust; or direct a compression wave through open air.

14 Claims, 14 Drawing Figures

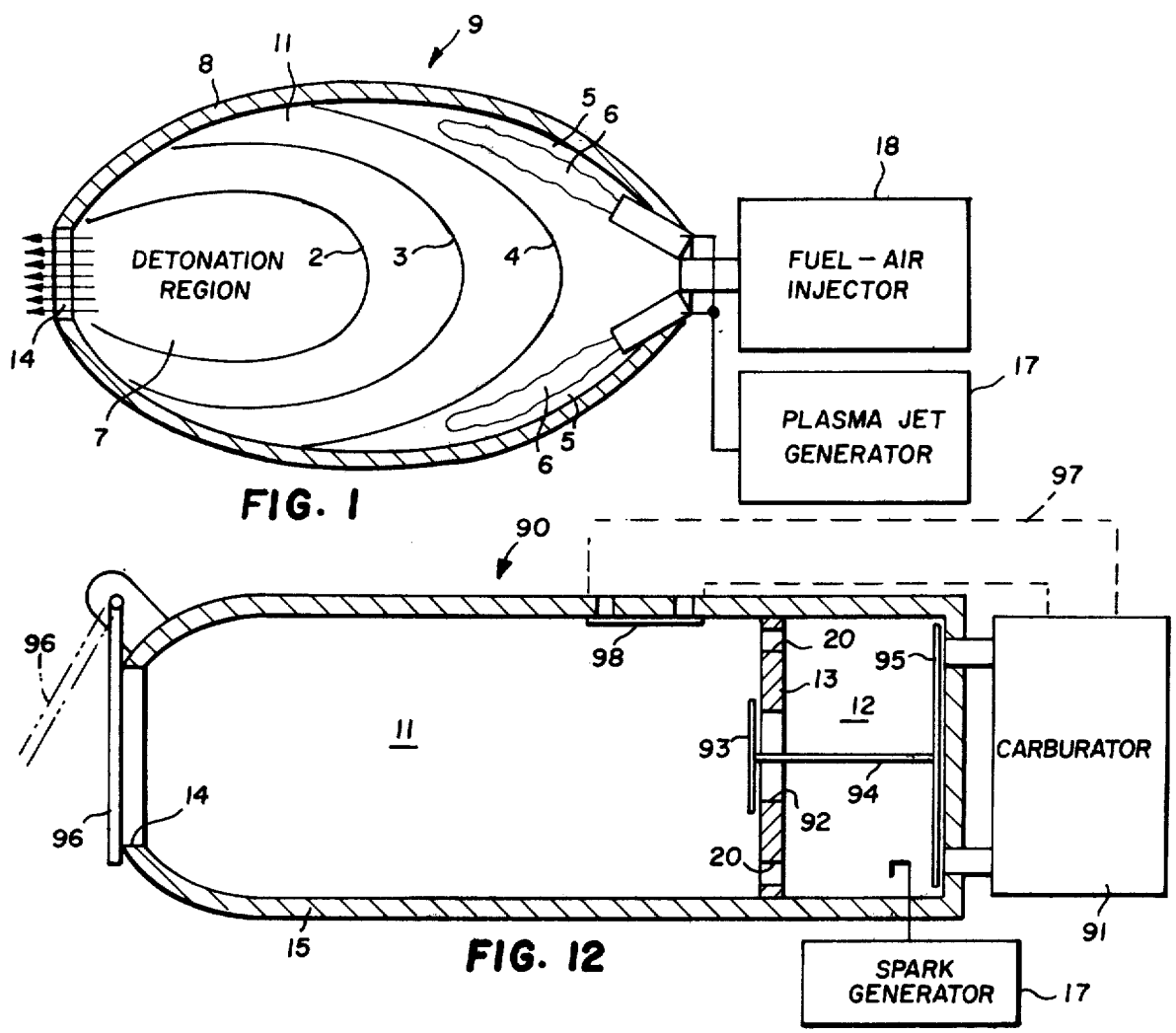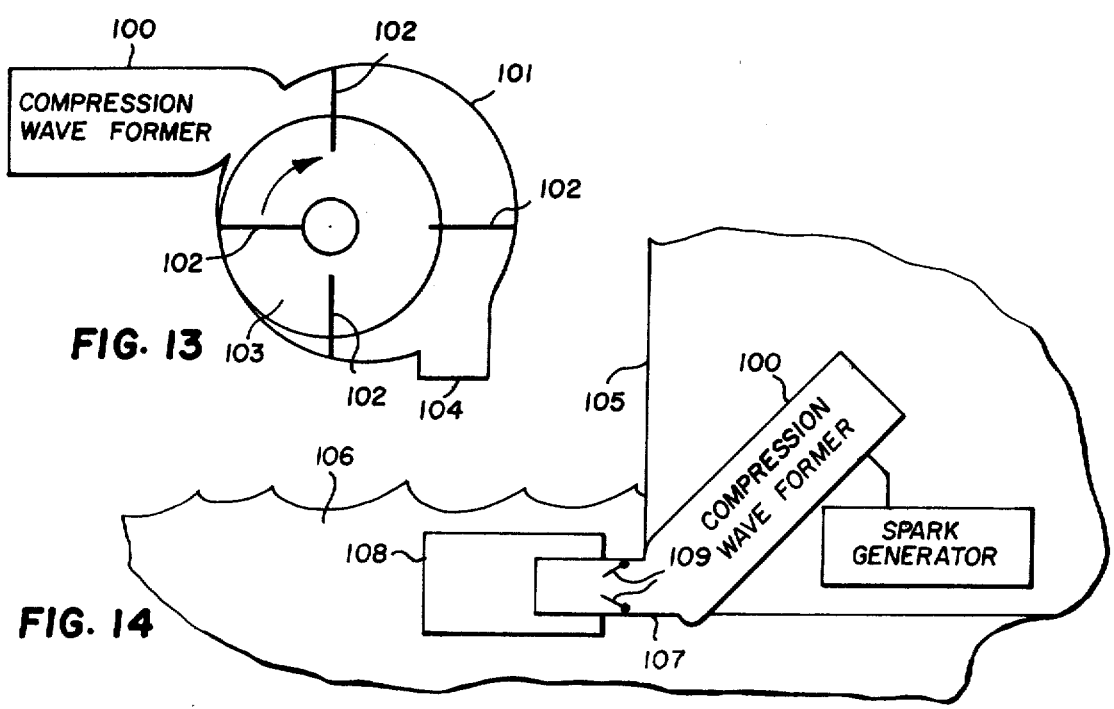

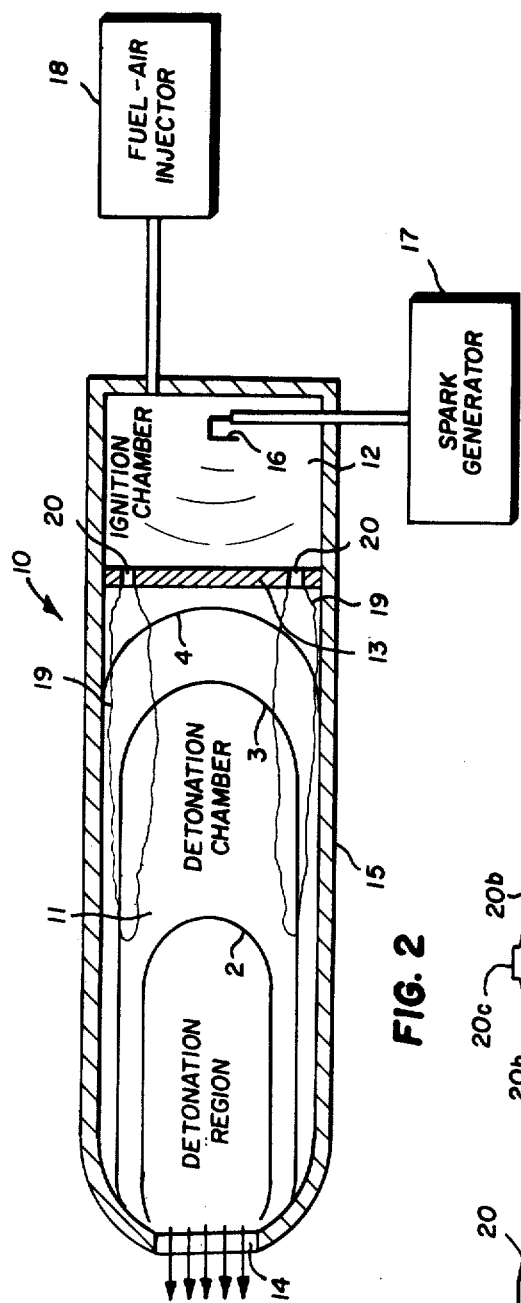
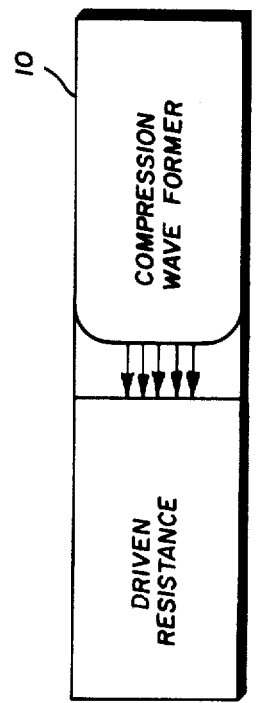
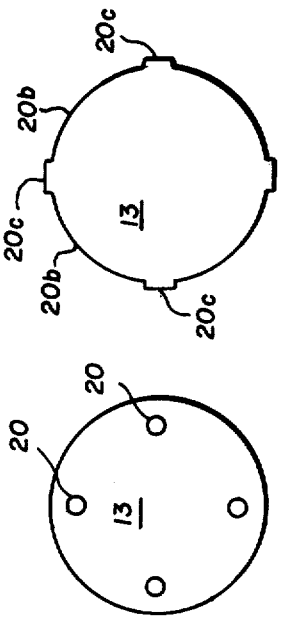
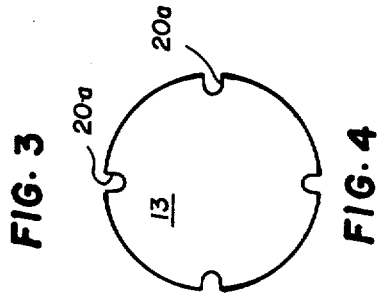
FIG. 2
FIG. 3
FIG. 4
FIG. 5
FIG. 6

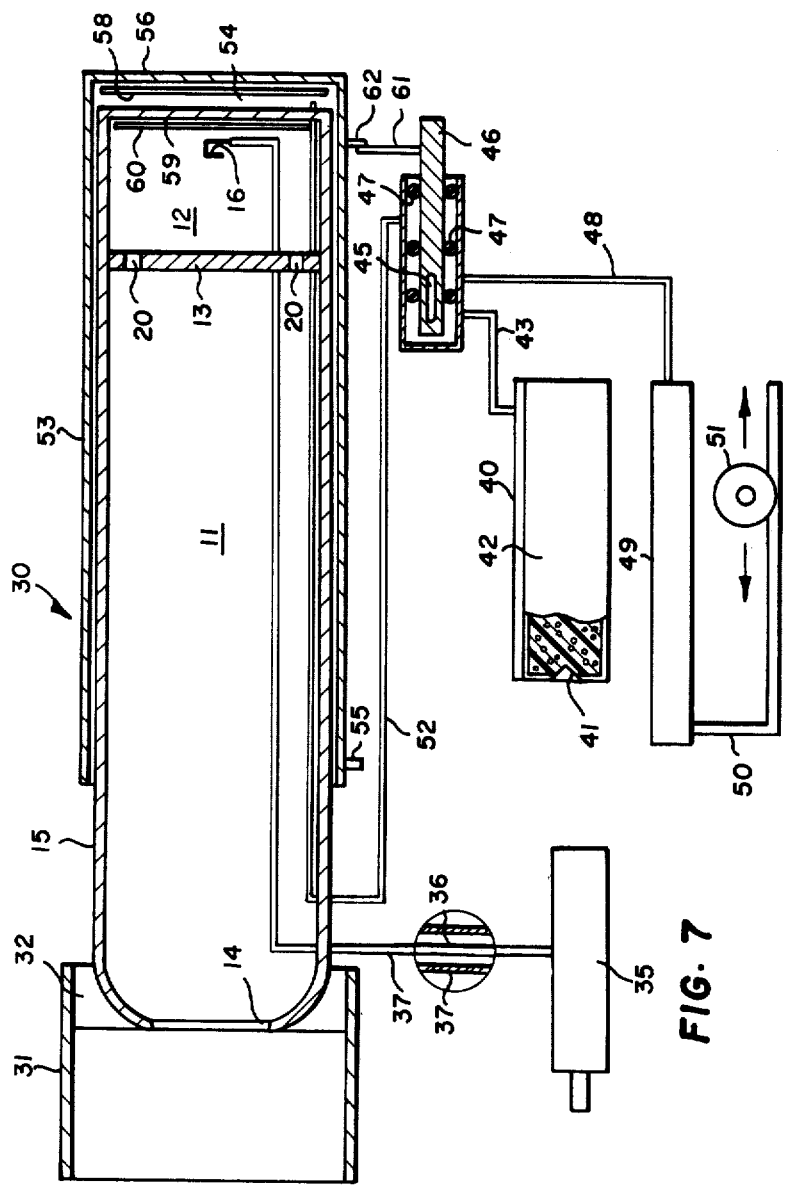
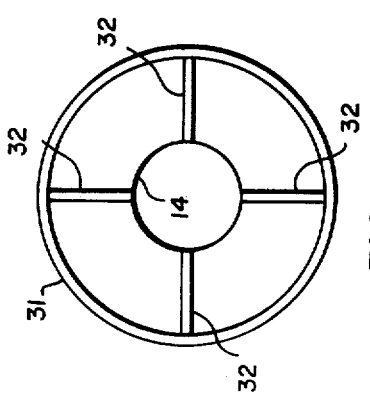
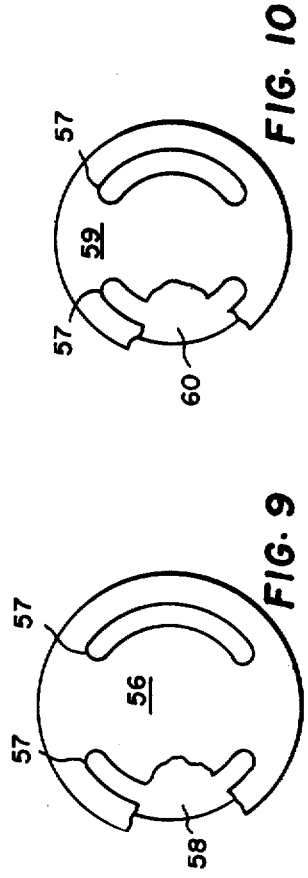

COMPRESSION WAVE FORMER

BACKGROUND OF THE INVENTION

I have devised a way of dynamically compressing and detonating a small volume of fuel-air mixture to form an abrupt compression wave that can transmit combustion energy directly to perform useful work. My invention does not require precompression of the fuel-air mixture, and it burns a portion of the mixture in a way that dynamically compresses and detonates the remainder without requiring mechanically movable parts. It is also directional in dynamically forcing the compression wave toward its target, and it does not require high strength containment of the detonation. It acts rapidly in creating a high pressure and does not transmit much wasted heat to a containing chamber. It affords a simple, lightweight, and compact way of transforming the chemical energy of a fuel directly into an abrupt, high pressure compression wave that can thrust against a relatively movable resistance to accomplish useful work.

My invention first led to a small gun that forms sharp compression waves and transmits them through air for several feet with sufficient force to knock over small objects and kill insects. Experiments with this showed that compression waves dynamically formed according to my invention can be made efficiently at different speeds and pressures and can be applied to many tasks. These include launching a projectile, driving a piston, powering an impact tool, powering a fastener driving tool, and serving as a prime mover supplying thrust energy for engines and other devices. My invention can operate in a single shot mode to form a compression wave for each ignition of a fuel charge, and it can also operate in a repeating mode to form a series of compression waves at frequencies as high as 500 hertz.

I have sought simplicity, economy, portability, compactness, fuel efficiency, versatility, and effectiveness in a compression wave former that can be put to many uses. My device can serve as a prime mover for quickly applying the energy of a detonated fuel to accomplish a task cleanly and efficiently with as few intermediates as possible between the combustion and delivery of working energy.

SUMMARY OF THE INVENTION

I form compression waves by detonating a mixture of fuel and air confined within a detonation chamber that has a constricted output opening. I ignite the mixture instantaneously throughout a peripheral region of the chamber opposite the output opening, and I shape the peripheral region of instantaneous ignition relative to the dimensions of the chamber and the output opening so that the burning of the mixture accelerates from the ignition region toward the output opening and inward from the peripheral region. This dynamically compresses and detonates the mixture to form the compression wave and direct it out of the output opening.

The instantaneous ignition can be done with plasma jets that fire along the length of the ignition region, or by an ignition chamber that injects flame jets into the ignition region of the detonation chamber. The ignition chamber is smaller than the detonation chamber and is separated from the detonation chamber by an ignition control wall having an open portion allowing gas to pass from the ignition chamber to the detonation chamber. A burnable mixture ignited in the ignition chamber causes a rapid increase in temperature and pressure that injects hot gas through the open portion of the control wall to instantly ignite the entire ignition region of the detonation chamber.

I have found that my high pressure compression waves can pass through air or thrust against a relatively movable resistance to perform work under many different circumstances. My device can produce a single compression wave for each triggering or can operate as a rapid repeater producing a series of compression waves at varying frequencies.

DRAWINGS

FIGS. 1 and 2 are partially schematic, longitudinal cross-sectional views of simplified embodiments showing ways of making compression waves;

FIGS. 3–5 are front elevational views of alternative control plates for the device of FIG. 2;

FIG. 6 is a schematic view showing the general application of my compression wave former to the driving of a resistance in performing work;

FIG. 7 is a schematic view of a preferred embodiment of my device used to direct a compression wave into ambient air;

FIG. 8 is a front elevational view of an output sleeve for the device of FIG. 7;

FIG. 9 is an elevational view of the rear end of a pump sleeve showing a diaphragm valve preferred for the embodiment of FIG. 7;

FIG. 10 is a rear elevational view of the housing for the detonation and ignition chambers showing a diaphragm valve preferred for the embodiment of FIG. 7;

FIG. 12 is a partially schematic, longitudinal cross-sectional view of another simplified embodiment of my invention showing preferred alternatives for charging the device with fuel;

FIG. 13 is a schematic diagram of application of my invention to a rotary engine; and FIG. 14 is a partially schematic diagarm of application of my invention to a marine engine.

DETAILED DESCRIPTION

Figure 11:
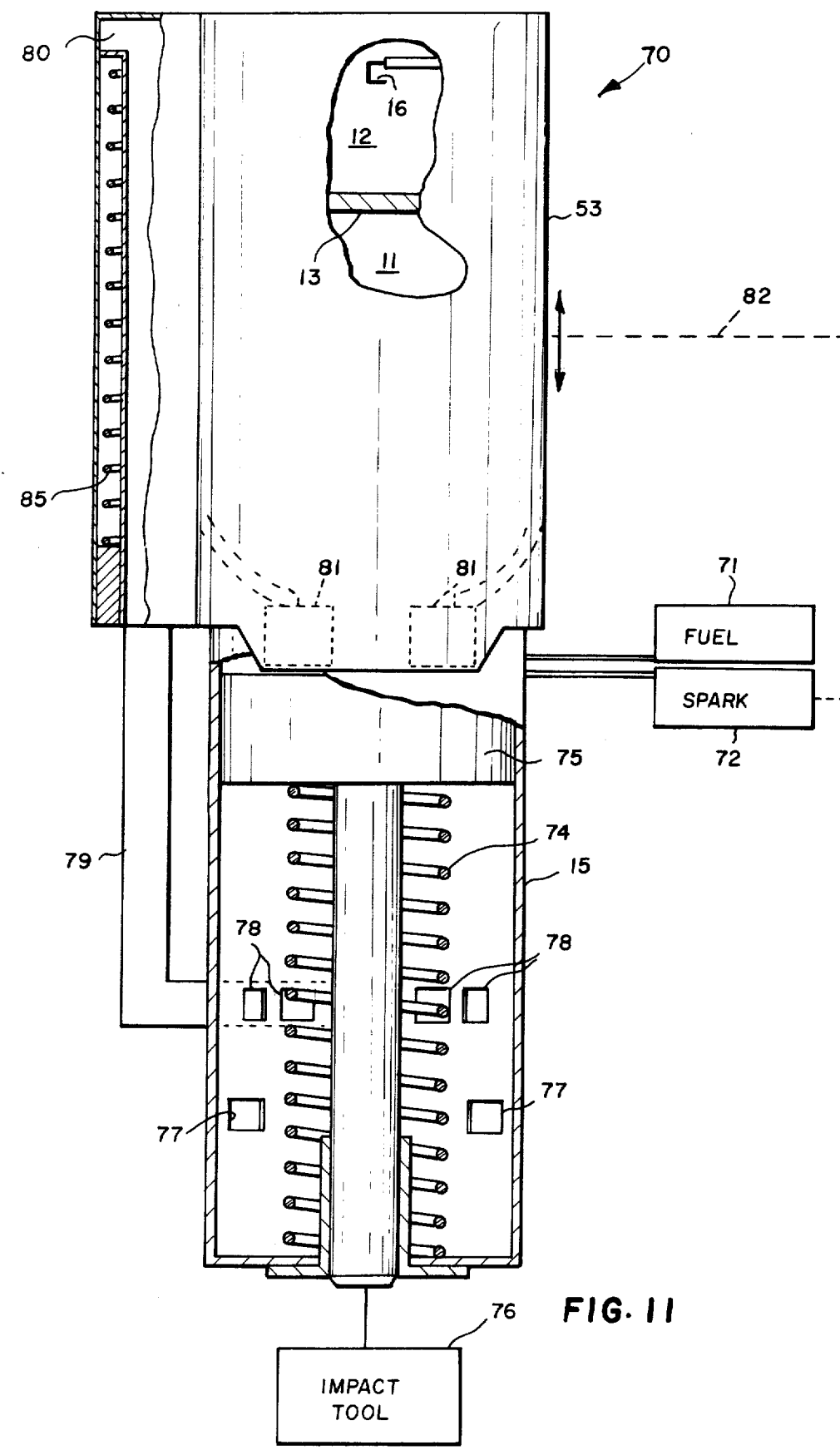
FIG. 11 is a partially schematic longitudinal cross-sectional view of another preferred embodiment of my compression wave former arranged for driving a piston.

FIGS. 1 and 2 show simplified devices for dynamically compressing and detonating a fuel-air mixture to form a compression wave according to my invention. Each has a detonation chamber 11 with a constricted output opening 14 and a fuel-air mixture injector 18. Each accomplishes dynamic compression and detonation, and they differ primarily in the way they ignite the fuel-air mixture.

In the embodiment of FIG. 1, detonation chamber 11 lies within a generally egg-shaped shell 8 with constricted output opening 14 at one end and an ignition region 5 around the periphery of the opposite end. A fuel source 18 fills detonation chamber 11 with a fuel-air mixture, and proper ignition of this accomplishes dynamic compression and detonation.

Suitable ignition occurs instantaneously throughout an ignition region that is properly located and dimensioned relative to chamber 11 and output opening 14. A point source ignition will not work, and the ignition region 5 that must be instantaneously ignited is generally opposite output opening 14 and extends toward output opening 14 along the periphery of chamber 11.

Instantaneous ignition throughout such an ignition region initiates a burn pattern that leads to dynamic compression and detonation as explained below, and effective ignition can be implemented in several ways.

In the embodiment of FIG. 1, this is accomplished by a plasma jet generator 17 directing hot plasma jets 6 along the walls 8 throughout the ignition region 5 of detonation chamber 11. Fast and reliable devices for firing flames instantaneously along ignition region 5 are also possible, and an alternative ignition system shown in FIG. 2 is explained below.

Proper ignition initiates combustion that accelerates through detonation chamber 11 to accomplish dynamic compression and detonation. The burning advances rapidly from the wide area of ignition region 5 toward output opening 14 and inwardly from chamber wall 8. The advancing flame front rapidly increases pressure and accelerates as it moves to enclose, compress, and detonate the mixture. Only a small fraction of a second elapses between the instantaneous ignition and the detonation, so I have not yet observed the advancing flame front. But from the cup-shaped area of the ignition region and the occurrence of the detonation, there is reason to believe the flame front has approximately the form of a diminishing paraboloid.

This process is schematically represented in FIG. 1 by estimated isobar lines 4, 3, and 2 showing rapidly increasing pressure as the flame front accelerates. Constricted output opening 14 blocks the escape of most of the unburned mixture from chamber 11, and the burning that advances inward along the periphery of chamber 11 next to walls 8 and accelerates toward opening 14 partially surrounds and traps unburned mixture in detonation region 7 inside isobar line 2 where dynamic compression occurs and the compressed mixture detonates forming a compression wave that is directed out of opening 14. The cup-shaped or paraboloid flame front cooperates with constricted output 14 to entrap, compress, and detonate most of the fuel-air mixture. In effect, part of the mixture burns in a pattern that effectively compresses the remainder, and the burning accelerates as the pressure rises to become a detonation as the compressed mixture explodes. This happens faster than the mixture can escape through opening 14.

The burning flame front that moves inward from wall 8 and advance toward output opening 14 gives direction and momentum to the eventual detonation so that more of its energy is directed out of opening 14 than inward into chamber 11. Also, the burn pattern beginning around the periphery and moving inward shields the wall 8 from heat and allows the device to operate at relatively cool temperatures. The rapid burning and detonation also assist in this by converting the chemical energy of the fuel and air mixture quickly into high pressure with little wasted heat.

The compression wave thrust out of opening 14 against a relatively movable resistance in performing useful work also takes advantage of a principle known in explosives that most of the energy is directed along the path of greatest resistance. This also increases efficiency by applying most of the thrust where it is needed, and it relieves wall 8 of the brunt of the detonation. Although the detonation speed can be varied and can be made subsonic, it can also be far faster to have the characteristics of a brisant explosion, concentrating its energy in pressure, rather than heat.

Compression wave former 10 as shown in FIG. 2 has a different system that uses part of the fuel-air mixture for instantaneously igniting the ignition region of detonation chamber 11 in a proper pattern to achieve dynamic compression and detonation. This is done with an ignition chamber 12 and a burn speed control wall 13 formed within a cylinder 15 that also includes detonation chamber 11. Combustion within ignition chamber 12 injects flames 19 into detonation chamber 11 through control wall 13 to ignite the entire ignition region of detonation chamber 11 at once. From this, burning accelerates along an approximately paraboloid front as explained above and as shown by estimated isobar lines 4, 3, and 2 for dynamically compressing and detonating the mixture in the detonation region inside isobar line 2.

Ignition chamber 12 is substantially closed and arranged on the opposite side of control plate 13 at the rear end of detonation chamber 11. Ignition chamber 12 is also smaller and preferably only about one-fifth the volume of detonation chamber 11, and it is preferably charged with the same fuel-air mixture used in detonation chamber 11. Openings 20 in control wall 13 admit flame jets to the ignition region of detonation chamber 11.

A spark gap 16 powered by a spark generator 17 ignites the fuel-air mixture near the rear of ignition chamber 12. A fuel injection system 18 injects a fuel-air mixture into ignition chamber 12, and this mixture passes through openings 20 in control wall 13 to fill both the ignition and detonation chambers with a burnable mixture. The fuel can be any airborne combustible material such as a flammable gas, a liquid spray, a combination of vapor and liquid drops, and possibly even airborne solid particles. The mixture of fuel and air is preferably proportioned for complete combustion. I have operated my device with butane, propane, and diesel oil; and there is reason to believe that many other fuels would work well.

The ignition begins with a spark at gap 16 igniting the fuel-air mixture in ignition chamber 12. This initiates an expanding flame front that advances through the mixture in ignition chamber 12 for a conventionally slow burn. Because the fuel in ignition chamber 12 is substantially enclosed, the combustion there causes a rapid increase in temperature and pressure; and this forces hot gas flames 19 through openings 20 in control wall 13 for an amplified ignition that instantly ignites the fuel-air mixture throughout the ignition region of detonation chamber 11.

The openings 20 in control wall 13 are sized and located to direct several long, hot jets of flames simultaneously from ignition chamber 12 into detonation chamber 11 for instantaneous ignition throughout the ignition region that extends from control wall 13 forward along the periphery of detonation chamber 11 next to cylinder wall 15. This initiates combustion that accelerates toward opening 14 and inward from wall 15 for dynamically compressing and detonating the fuel-air mixture to drive an abrupt compression wave through output opening 14 as explained above.

The hot flaming jets of gas injected through openings 20 into detonation chamber 11 should be properly positioned and aimed for instantaneously igniting enough of the mixture to form an advancing flame front with the proper shape and speed to accomplish dynamic compression and detonation. The ignition flame shape and location can be changed with different size or number of openings in control plate 13, and different positions of control plate 13 establishing the proportionate sizes of detonation chamber 11 and ignition chamber 12.

From experience I have found that a single flame jetting straight through a central hole in a circular disk control wall 13 does not work well and that several smaller holes around the periphery of plate 13 work much better. Long jets of hot gas directed along the wall of detonation chamber 11 work best, and several workable alternatives are illustrated in FIGS. 3–5. These show respectively that holes 20, narrow notches 20a, and wide notches 20b separated by narrow lands are all possible. Different numbers of holes or notches can also work.

I have made a workable compression wave former about the size and shape of a small hand gun having detonation and ignition chambers formed within a cylindrical housing 15 having an inside diameter of about 45 mm and a control wall 13 positioned so that detonation chamber 11 is about 160 mm long and ignition chamber 12 is about 40 mm longer. Four 4 mm holes 20 near the periphery of control wall 13 proved successful in rapidly igniting and burning the charge in detonation chamber 11 to form a sharp and abrupt compression wave with a clean and complete burn using relatively little fuel. A dollar's worth of butane at present retail prices provides about 4,000 shots with such a device.

Instantaneous ignition throughout the ignition region spread around the rear periphery of detonation chamber 11 leads to a dynamic compression and detonation that burns the fuel-air mixture almost completely within detonation chamber 11 without flames shooting out of open end 14. Igniting the fuel-air mixture only at a single point near control wall 13 at the rear end of detonation chamber 11 causes a relatively slow combustion expansion that proceeds toward opening 14 and forces unburned mixture out of opening 14 causing flames to shoot out of opening 14. This diminishes the abruptness and amplitude of the compression wave and reduces its efficiency. Long jets of hot gas directed along wall 15 and extending well into detonation chamber 11 instantly ignite the wide area of the entire ignition region of detonation chamber 11 and initiate more rapid combustion leading quickly to dynamic compression and detonation to produce a sharp and effective compression wave.

I initially devised my compression wave former to direct a compression wave into open air from a hand gun. I made adjustments in chamber sizes, control wall openings, and fuel-air mixtures according to the feel of each shot, the appearance of the burn as viewed through a transparent wall, and the force and directionality of the compression wave that traveled outward through the air. I found that decreasing the size of openings 20 in control plate 13 increased the burn speed but made excessive noise and decreased the accuracy and range of the compression wave traveling through the air. A single hole in the center of plate 13 caused incomplete combustion and low power with a back wave prolonging combustion and overheating the detonation chamber, but a different detonation chamber configuration might overcome these problems. Larger openings 20 reduced the burn speed and the fuel efficiency and also reduced the range of the compression wave.

Compression waves directed through the air from my hand gun can knock over small plastic and metal containers up to 12 feet away and can incapacitate or kill house flies and other small flying insects at up to 6 feet. Larger and better protected crawling insects such as cockroaches require maximum power and a close range of, for example, 1 foot for a positive kill. I have been able to kill small insects on plants, on windows, and behind curtains by compression waves that cause no damage within a house, are not apparently harmful to humans or plants, and do the job cleanly with no mess. My device can also launch projectiles by using a compression wave to propel them from a barrel.

Further experiments have shown that my compression wave former can direct a compression wave against a relatively movable resistance within a confined area to act as a prime mover applying work energy directly to a variety of tasks. Variations in the burn pattern accelerating through the detonation chamber can dimension the detonation and compression wave for speed, sharpness, and amplitude to suit a specific task.

The dynamic compression leading to a rapid detonation makes my wave former more efficient than other energy transmitters using mechanical compression of a burnable mixture. I have applied my device to impact tools for driving fasteners and have reason to believe it can drive pistons, rotor vanes, plungers, and other relatively movable resistances. I have also used the thrust of compression waves from my device directed against water to serve as a marine engine. My calculations show that large increases in efficiencies are possible in dynamically compressing and detonating a fuel-air mixture and applying the resulting compression wave directly against a working resistance, as compared to other prime movers requiring mechanical compression and intermediate elements in the energy transmission chain. FIG. 6 schematically illustrates working possibilities that are described in more detail below.

FIG. 7 schematically shows a "bug gun" version of my compression wave former as referred to above for producing a controlled and directional compression wave that travels rapidly through air. It amplifies ignition from spark gap 16 in ignition chamber 12 to force ignition jets through openings 20 in control plate 13 into detonation chamber 11 as already described. The additional features shown in FIG. 7 provide simple ways for charging and firing the gun and directing the compression wave outward into open air.

Output opening 14 of wave former 30 of FIG. 7 is constricted or narrowed relative to cylindrical wall 15, and this not only helps produce a detonation but also helps direct the compression wave linearly into ambient air. A cylindrical sleeve 31 surrounds output opening 14 and is open to ambient atmosphere at each axial end. It is supported by vanes 32 to allow air to move in behind the advancing compression wave to help increase its range and stability. Sleeve 31 also makes the gun safer by providing a rearward escape route to dissipate a compression wave if the forward end of sleeve 31 is covered over during a shot.

Trigger 35 produces an ignition spark at gap 16 in ignition chamber 12, and an easy and preferred way of accomplishing this is with a piezoelectric element that is mechanically compressed to produce a voltage in an insulated line 36 contained within a grounded metal tube 37 and leading to gap 16 as illustrated.

The reaminder of FIG. 7 involves fuel metering and charging of compression wave former 30. This is accomplished from a fuel cell 40 filled with butane or other flammable gas via a valve 41. A foamed resin material 42 in cell 40 insures that only vaporous fuel leaves cell 40 regardless of orientation. A fuel line 43 from cell 40 leads to a transfer passage 45 in an axially movable valve 46 sealed with O-rings 47.

In the illustrated position, transfer passage 45 admits gaseous fuel to line 48 leading to metering chamber 49 that has an adjustable volume to control the amount of fuel charge. This is accomplished by a flexible resin tube 50 connected to and forming a part of metering chamber 49 and a pinch roller 51 that is movable along the length of tube 50 to close off tube 50 at different points for adjusting metering chamber volume.

The volume of pressurized gas in metering chamber 49 is used to charge wave former 30. This occurs when valve 46 actuates to move transfer passage 45 so that compressed fuel vapor in metering chamber 49 passes to wave former 30 via lines 48 and 52.

The fuel transfer is accomplished by a pump formed of a sleeve 53 surrounding cylindrical housing 15 and reciprocally movable relative to housing 15. Sleeve 53 necessarily has a larger diameter than housing 15 and is dimensioned so that when sleeve 53 is pulled all the way back, it opens up a filling chamber 54 having a volume slightly larger than the total volume of chambers 11 and 12. Fuel first enters filling chamber 54 and then is pumped into the ignition and detonation chambers as sleeve 53 closes.

The pumping action of sleeve 53 is made possible by a pair of diaphragm valves. The rear end 56 of sleeve 53 has openings 57 that are covered by a neoprene diaphragm 58 serving as a one-way valve. Rear end 59 of housing 15 has similar openings covered by a similar neoprene disk 60 also serving as a one-way valve.

When sleeve 53 moves rearwardly, air enters through openings 57 past valve 58 into filling chamber 54 that enlarges inside sleeve 53 behind the rear wall 59 of housing 15. When sleeve 53 is near the end of its rearward travel, stop 55 engages a projection 61 to move valve 46 and allow pressurized fuel to flow via lines 48 and 52 into filling chamber 54 where it mixes with air.

As sleeve 53 returns forward toward the illustrated position, the fuel-air mixture in filling chamber 54 is forced past valve 60 at the rear end of ignition chamber 12 to fill ignition chamber 12 with a combustible mixture that flows through openings 20 in control wall 13 and also fills detonation chamber 11 while forcing any residue from a previous shot out of front opening 14. As sleeve 53 slides home, stop 62 engages projection 61 to move valve 46 to the illustrated position for blocking line 52 and recharging metering chamber 49 for the next shot.

Gun 30 is now loaded by being substantially filled with a burnable fuel mixture, and it is aimed and fired by pulling trigger 35. This produces the instantaneous ignition, dynamic compression, and detonation as previously explained and directs a compression wave out of opening 14, through sleeve 31, and into the air. The entire gun 30 can be formed compactly as a small hand gun and is useful for killing insects and providing short range target practice as previously explained.

The compression wave former 70 of FIG. 11 forms a compression wave that drives a piston or plunger 75 for powering an impact tool 76 such as a nailer, stapler, riveter, or hammering tool. Ignition and detonation chambers are charged by reciprocal movement of sleeve 53 as previously explained or by an alternative device for injecting fuel from a supply 71. Spark generator 72 operates as previously explained to ignite the fuel and form a compression wave that drives piston 75 downward against its spring 74 to operate impact tool 76. Chamber dimensions and ignition control wall openings can be adjusted so that the compression wave has a suitable shape and intensity for operating piston 75 efficiently.

Vents 77 prevent compression or rarefaction on the underside of piston 75, which opens exhaust ports 78 as it nears the bottom of its travel. Some of the exhaust energy from ports 78 is directed through a line 79 to expand an actuator chamber 80 against spring 85. Chamber 80 is connected to sleeve 53 so that exhaust gas driving chamber 80 upward also moves sleeve 53 to recharge wave former 70. As sleeve 53 moves rearwardly, it opens clearing ports 81 to exhaust spent gases from the previous shot. This continues until sleeve 53 returns to its illustrated closed position after the device is completely cleared of the residue of a previous shot and completely filled with a new combustible mixture for the next shot.

Wave former 70 can complete a full cycle in a fraction of a second so that it is ready for another shot as quickly as an operator can pull a trigger to generate another spark. As shown schematically by broken line 82, both the fuel recharging from fuel supply 71 and a spark from generator 72 can be provided from the mechanical movement of sleeve 53. This allows repeatedly forming a series of compression waves as long as a trigger is held closed, with a spark generator determining the frequency. This can accomplish repeated hammering for an impact tool 76, and wave former 70 can serve as a prime mover delivering a series of compression waves that can be applied to many tasks, including driving a reciprocating piston connected to a crank shaft by a connecting rod, driving rotary vanes, and accomplishing propulsion by applying thrust directly to a resistance such as water. The device of FIG. 10 can be powered by a conventional propane bottle to deliver as many as 20,000 shots for a present retail price of about $1.49. My device will also operate on other gaseous, liquid, or airborne fuels so that it can be applied to many uses.

FIG. 12 schematically shows a compression wave former 90 similar to wave former 10 of FIG. 2 but using preferred alternatives for fuel supply and repeating action. Carburetor 91 schematically illustrates the possibility of mixing a wide variety of fuels with air for injection into wave former 90. Any fuel-air mixture that burns rapidly enough to accomplish dynamic compression and detonation should be workable in my device.

To speed up the recharging of detonation chamber 11 and ignition chamber 12, a valve port 92 is formed in control plate 13 to open a much larger opening than provided by ignition control openings 20. A valve 93 for port 92 is connected by a rod 94 with a valve 95 admitting a fuel-air mixture from carburetor 91 into wave former 90. Increased pressure from combustion in chamber 12 operates over a much larger area of valve 95 than valve 93 so as to close both valves and limit ignition injection into detonation chamber 11 to flame jets through control openings 20. This proceeds toward detonation as previously explained.

The high pressure from the detonation forces gas out of detonation chamber 11 rapidly through constricted output opening 14 as previously explained. The pressure also rapidly decreases after detonation, and a schematic check valve 96 movably positioned just beyond output opening 14 responds to this by closing off detonation chamber 11 when the pressure drops after detonation. This quickly produces a high vacuum within detonation chamber 11 and draws in a fresh charge of a fuel-air mixture. The rapid and sharp changes in pressure during and after a detonation can thus be exploited to exhaust and recharge wave former 96 very rapidly.

In practice, instead of check valve 90, ports suitably positioned relative to the movement of a piston or other element driven by a compression wave directed out of opening 14 can be arranged to be opened and closed at the proper times to vent the exhaust and then close off detonation chamber 11 and create a vacuum that quickly recharges wave former 90.

Another way to speed up recharging of wave former 90 is for carburetor 91 to direct a portion of its charge directly into detonation chamber 11 via an alternative passageway 97 and a valve 98. This can be an alternative to port 92 and valve 93 and can work in cooperation with valve 96 or the opening and closing of exhaust ports to accomplish very rapid recharging with minimal moving parts. There is reason to believe that by using these measures my device can attain firing frequencies as high as 500 hertz.

FIG. 13 schematically shows one of my compression wave formers 100 applied to a rotary engine 101 having rotating vanes 102 turning with a rotor 103 as shown schematically to provide expanding and contracting chambers. An exhaust port 104 vents spent gases; and because the fuel need not be mechanically compressed, several wave formers 10 can be arranged to provide driving thrust in several lobes around the periphery of a single rotor 103.

FIG. 14 schematically shows one of my compression wave formers 100 serving as a marine engine to propel a boat 105. Compression waves thrust through a venturi tube 107 directly against water 106 within a surrounding venturi tube 108. Pivotal check valves 109 prevent water from entering the detonation chamber at slow speed, but the water is driven well back into the venturi system at high speed. A spark generator controls the speed; and the engine is lightweight, simple, and efficient in applying high pressure thrust from fuel detonation directly to the water to propel the boat without using intermediate energy transmitters and without requiring mechanical compression of the fuel. Complete combustion assures clean operation that also occurs quietly and coolly underwater.

Although considerable work remains in investigating the possibilities for my invention, there is reason to believe that it can increase the efficiency of many prime mover tasks. Its dynamic compression and detonation makes it powerful and efficient, it applies combustion energy directly to a relatively movable resistance, it converts the fuel to high pressure without wasting much heat or becoming hot, and it does this with a simple and lightweight device having minimal moving parts. Once my invention is fully understood, it may have many more uses than already suggested.

I claim:

1. A compression wave former comprising:
 a. a detonation chamber having an ignition region at one end, an output region at an opposite end, and a fuel detonation region between said ignition region and said output region;
 b. an ignition chamber smaller than said detonation chamber and arranged adjacent said one end of said detonation chamber;
 c. an ignition control wall separating said ignition and detonation chambers;
 d. said output region of said detonation chamber being formed with a constricted output opening having a smaller cross-sectional area than said detonation chamber;
 e. means for charging said ignition chamber and said detonation chamber with a mixture of air and fuel;
 f. an igniter in said ignition chamber for igniting said mixture in said ignition chamber; and
 g. a peripheral region of said control wall having a plurality of through openings arranged so that a rapid increase in temperature and pressure that occurs soon after ignition in said ignition chamber simultaneously injects a plurality of hot gas jets through said openings of said control wall and into said ignition region of said detonation chamber, said hot gas jets being directed by said control wall openings along a peripheral region of said detonation chamber toward said output region of said detonation chamber to simultaneously initiate in said detonation chamber a burning of said mixture that accelerates towards said output region and inward from said peripheral region for dynamically compressing said mixture in said detonation region to detonate said dynamically compressed mixture and form a compression wave directed out of said output opening.

2. The compression wave former of claim 1 wherein said detonation chamber and said ignition chamber are arranged within a cylindrical housing and said ignition control wall is generally circular.

3. The compression wave former of claim 1 wherein said burning of said mixture in said detonation chamber accelerates along a front that is approximately paraboloid.

4. The compression wave former of claim 1 wherein said charging means leaves said mixture uncompressed in said detonation chamber before said ignition.

5. The compression wave former of claim 1 including means for exhausting gas from said detonation and ignition chambers after said detonation, means for recharging said detonation and ignition chambers with said mixture, and means for reigniting said mixture in said ignition chamber to repeat said detonation.

6. The compression wave former of claim 1 wherein said charging means includes means for closing said detonation chamber after said detonation to create a vacuum in said detonation chamber for drawing said mixture into said detonation chamber to repeat said detonation.

7. The compression wave former of claim 1 including means moved by said compression wave for recharging said detonation chamber with said mixture to repeat said detonation.

8. The compression wave former of claim 1 including means for directing said compression wave against a relatively movable resistance to perform work.

9. The compression wave former of claim 1 including means driven by a series of said compression waves for operating an impact tool.

10. The compression wave former of claim 1 including means arranged to be driven by said compression wave for driving fasteners.

11. The compression wave former of claim 1 wherein said ignition chamber has about one-fifth the volume of said detonation chamber.

12. The compression wave former of claim 1 wherein said igniter is an electrical spark gap arranged in a rear region of said ignition chamber.

13. The compression wave former of claim 1 including a piston arranged beyond said output opening to be driven by said compression wave for transmitting energy.

14. The compression wave former of claim 1 wherein said charging means has an element arranged beyond said output opening for using a portion of said compression wave for recharging said ignition and detonation chambers with said mixture.

* * * * *